United States Patent
Albus et al.

[11] Patent Number: 6,098,269
[45] Date of Patent: Aug. 8, 2000

[54] TRANSFER LINE WITH PROCESSING STATIONS

[75] Inventors: Werner Albus, Rangendingen; Horst Ballmer, Murr; Thomas Bayha, Markgrönigen; Jürgen Casper, Möglingen; Siegmund Chmielnicki, Freiberg; Berend Denkena, Schwieberdingen; Helmut Elder, Hessigheim; Werner Glock, Marbach; Uwe Görz, Freiberg; Hans Götte; Peter Heller, both of Ludwigsburg; Wolfgang Horn, Pleidelsheim; Karl-Heinz Lang, Ludwigsburg; Willi Leible; Georg Leutgeb, both of Obersteinfeld; Andrea-Daniela Markl, Ludwigsburg; Rudolf Roith, Benningen; Hans-Werner Schulz, Bietigheim; Rolf Teurer, Remseck; Bernd Walker, Esslingen; Sören Welb, Ilsfeld; Helmut Zimmermann, Steinheim; Dieter Fröhlich, Kirchberg, all of Germany

[73] Assignee: Hüller Hill GmbH, Ludwigsburg, Germany

[21] Appl. No.: 09/091,211
[22] PCT Filed: Dec. 5, 1996
[86] PCT No.: PCT/EP96/05443
  § 371 Date: Aug. 18, 1998
  § 102(e) Date: Aug. 18, 1998
[87] PCT Pub. No.: WO97/21518
  PCT Pub. Date: Jun. 19, 1997

[30] Foreign Application Priority Data

Dec. 9, 1995 [DE] Germany .......................... 195 46 030
Jul. 2, 1996 [DE] Germany .......................... 196 26 581

[51] Int. Cl.[7] ................................................ B23P 23/00
[52] U.S. Cl. .......................... 29/564; 29/564.1; 29/564.2; 29/563
[58] Field of Search ................................. 29/564, 564.1, 29/564.2, 563

[56] References Cited

U.S. PATENT DOCUMENTS

| | | |
|---|---|---|
| 2,668,557 | 2/1954 | Hoelscher . |
| 3,934,700 | 1/1976 | Schubert et al. .......................... 198/19 |
| 5,163,222 | 11/1992 | Imlig et al. .............................. 29/827 |

FOREIGN PATENT DOCUMENTS

| | | |
|---|---|---|
| 0 496 995 A1 | 8/1992 | European Pat. Off. . |
| 1107310 | 5/1961 | Germany . |
| 92 03 125 | 6/1992 | Germany . |
| 92 08 735 | 10/1992 | Germany . |
| 92 08 584 | 11/1992 | Germany . |
| 43 24 575 A1 | 2/1994 | Germany . |
| 667 834 | 11/1988 | Switzerland . |
| 2 040 244 | 8/1980 | United Kingdom . |

*Primary Examiner*—P. W. Echols
*Assistant Examiner*—John C. Hong
*Attorney, Agent, or Firm*—McGlew and Tuttle, P.C.

[57] ABSTRACT

A transfer line with devices for conveying work pieces along the central bases, lateral bases set up along the sides of the central bases on which the processing units are mounted so as to be capable of displacement, and supply devices for the processing stations. In order to improve access to the transfer line and simplify component units, the following features are proposed: a) the supply devices along the direction of travel of the work pieces are arranged exclusively within or in the region of and/or above the central bases; b) the supply devices are connected to each processing station via short detachable connecting pieces; c) shut-off devices are provided at least in the main lines for hydraulics, lubrication, pneumatics etc.; and d) at least one control block with valves is provided between the shut-off devices and the processing station. Alternatively, it is proposed that a control panel with a control block should be provided in the immediate vicinity of the work piece conveyor line and should be connected via valve tubes to a distributor block and/or directly to the main lines for hydraulics, lubricants, pneumatics or the like and to the consumer units of the processing station.

12 Claims, 4 Drawing Sheets

TRANSFER LINE WITH PROCESSING STATIONS

FIELD OF THE INVENTION

The invention relates to a transfer line for machine tools for mechanical, metal removing processing of work pieces at processing stations with devices for conveying work pieces along the central bases, lateral bases set up along the sides of the central bases on which the processing units are mounted so as to be capable of displacement and supply devices for the processing stations.

BACKGROUND OF THE INVENTION

Known from the German registered utility model G 92 08 735.3 U1 is a generic transfer line where processing stations for processing of work pieces moved in the transfer line are arranged laterally of the transfer line and where supply lines for the processing stations are laid in parallel to the transfer line at the sides underneath and/or above the lateral units. These known transfer lines dispose of their own supply lines and also of their own plates each located outside to serve the processing stations positioned at both sides of the transfer line. In order to get access from outside between the processing stations straight through to the table with the transport device for the work pieces, one has to pass through under and/or over the supply units which run in the direction of transportation. The structure either involves a very tall construction height or a narrowed passage and thus it leads to a worse accessibility to the processing stations and to the transfer line. Moreover, if plates are mounted outside at the sides, long fluid lines to the consumers of the processing stations are needed, particularly to the pneumatic tool tension jacks.

EP 0496 995 B 1 describes an assembly device for parts in a pallet conveyor belt, where assembly units are arranged laterally of the conveyor belt which can be moved to the conveyor belt transversely of the pallet transfer direction and where compressed-air and air suction mains as well as the feeder cable for supply of electric power to the assembly unit are arranged underneath of the conveyor belt. Each assembly unit can be engaged and coupled to the supply units if it is in a forward moved position. The type of connection is not described more closely therein.

SUMMARY AND OBJECTS OF THE INVENTION

It is the primary object of the invention to provide a generic transfer line that allows for a quick and simple connection of the individual processing stations with the supply units.

According to the invention, a transfer line for machine tools for mechanical, metal removing processing of work pieces is provided with processing machines with a transport track with devices for conveying work pieces along a central bases. Lateral bases are set up along the sides of the central bases on which the processing units are mounted so as to be capable of displacement. Supply devices are provided for processing stations including the processing units. A plate with a control block is mounted in an immediate vicinity to the transport track of the work pieces. The control block is connected on the one hand through valve tubes with a distribution block and/or directly with the fluid mains for hydraulics, lubrication, pneumatics or similar and on the other hand with the consumers of the processing station. The control block is arranged at the underside of the plate. The plate is wholly or partly shaped as a cover for the central tunnel surrounding the transport track of the work piece. One or more clamping cylinder(s) for the work pieces is/are affixed to the plate.

Here, the plate with the pertaining control block is so arranged that short connection lines to the processing units are made possible and that sufficient accessibility from outside and service congeniality are given even if the construction style is a very compact one.

One distribution block each with the relevant lockable connections can be installed as a component unit into the fluid mains for each processing station. Consequently, pre-assembled distribution blocks, if required with the pertaining valve tubes, can be installed locally within the shortest possible time and/or be exchanged in case of a repair.

It turned out to be favorable to shape the plate wholly or partly as a cover of the central tunnel which surrounds the transport track of the work piece and to mount the control block preferably at the underside of the plate and to affix the clamping cylinder(s) for the work pieces likewise at the plate. The plate can be of a one-partite or multiple-partite configuration and be removable as an overall unit or in single components preferably independently of the supply units. To this effect it may be mounted particularly on vertical supports of the device base body. It is expedient for the plate to cover the whole length of the cycle unit in the direction of work piece transport, with it covering at least two stations, preferably one working station and one empty station where the work piece can be measured and monitored. Suction nozzles and/or pressure relief flaps for discharge of emission gases evolving on processing e.g. of magnesium work pieces may be arranged in the plate. A plate should also be equipped at least with one preferably lockable opening for take-out of work pieces.

According to further preferred particulars of the invention:

a) the supply lines running in the direction of work piece transport are solely arranged within or in the area and/or above the central base;

b) the supply lines are connected to each processing station via short, detachable connection pieces;

c) shut-off devices are at least mounted in the fluid mains for hydraulics, lubrication, pneumatics, etc.; and d) at least one control block with valves is mounted between the shut-off devices and processing station.

The supply units running in the direction of work piece transport at least include for electric conductor rails, a cable duct, the principal fluid mains for hydraulics, lubrication, pneumatics or similar and the coolant mains for high and low pressure. As provided for under this invention, all of these supply lines should not be located above or underneath the lateral units, but solely within or in the area of the central base. In conformity with this invention it may imply that the coolant mains for high and low pressure are mounted laterally to or even completely in the central base. The other supply units are preferably mounted above the central base and/or above the central tunnel surrounding the work piece transport track. As described for a special construction type the cable ducts, conductor rails and fluid mains for hydraulics, lubrication, pneumatics or similar are affixed laterally to or above of supports which in turn rest on the round body of the device and/or on the central base. These supply units are shifted laterally away from the central plane of the central tunnel to such an extent that the central tunnel provides for free access even at the top and so that tools and work pieces, after removal of the central tunnel cover, are accessible from the top or can even be installed from the top and/or dismantled towards the top, if required.

The supply units are moreover connected to each processing station via short, detachable connection pieces as described under feature (b). The cable ducts and conductor rails may be connected through branch channels running transversely to the direction of work piece transport with the switch cabinets located outside in the area of the ends of the lateral bases. These branch channels are located above and in the area of the lateral bases in such a manner that the access area between two lateral bases remains entirely free from the side towards the central base. To achieve this target the high and/or low pressure mains for the coolant are connected to the processing units via lines integrated in the lateral base and/or mounted unilaterally or bilaterally at the lateral base. The valves for the coolant supply to the processing units may be mounted above the water ducts at the outer ends of the lateral bases. All in all, there are no supply units at all mounted either in the direction of work piece transport or transversely to it that might obstruct unhindered access from the side between lateral bases with the processing units straight through to the central base. On the whole these measures already improve operation convenience and service congeniality of the transfer line remarkably.

In order to be able to take each cycle unit out of operation or to remove and install it, if possible, independently of the other cycle units with regard to a most perfect modular construction style, it is envisaged as per feature (c) to arrange shut-off devices or plug-in connectors at least in the fluid mains for hydraulics, lubrication, pneumatics, etc. but also, if at best possible, in the cable ducts and conductor rails.

In connection with the shut-off devices in the fluid mains it is furthermore preferable to locate at least one control block with valves at closest possible vicinity to the shut-off devices for the operation of a processing station. Thus the control block is no longer mounted at the extreme end of the lateral base as usually done hitherto, but in the area of the central base. Achieved hereby is a drastic reduction in the length of lines to the processing stations in conjunction with a reduction in the signalling times of hydraulic and pneumatic control signals. The hydraulic, pneumatic, and lubrication valves are well visible from one side, accessible and adjustable even if the machine is running.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
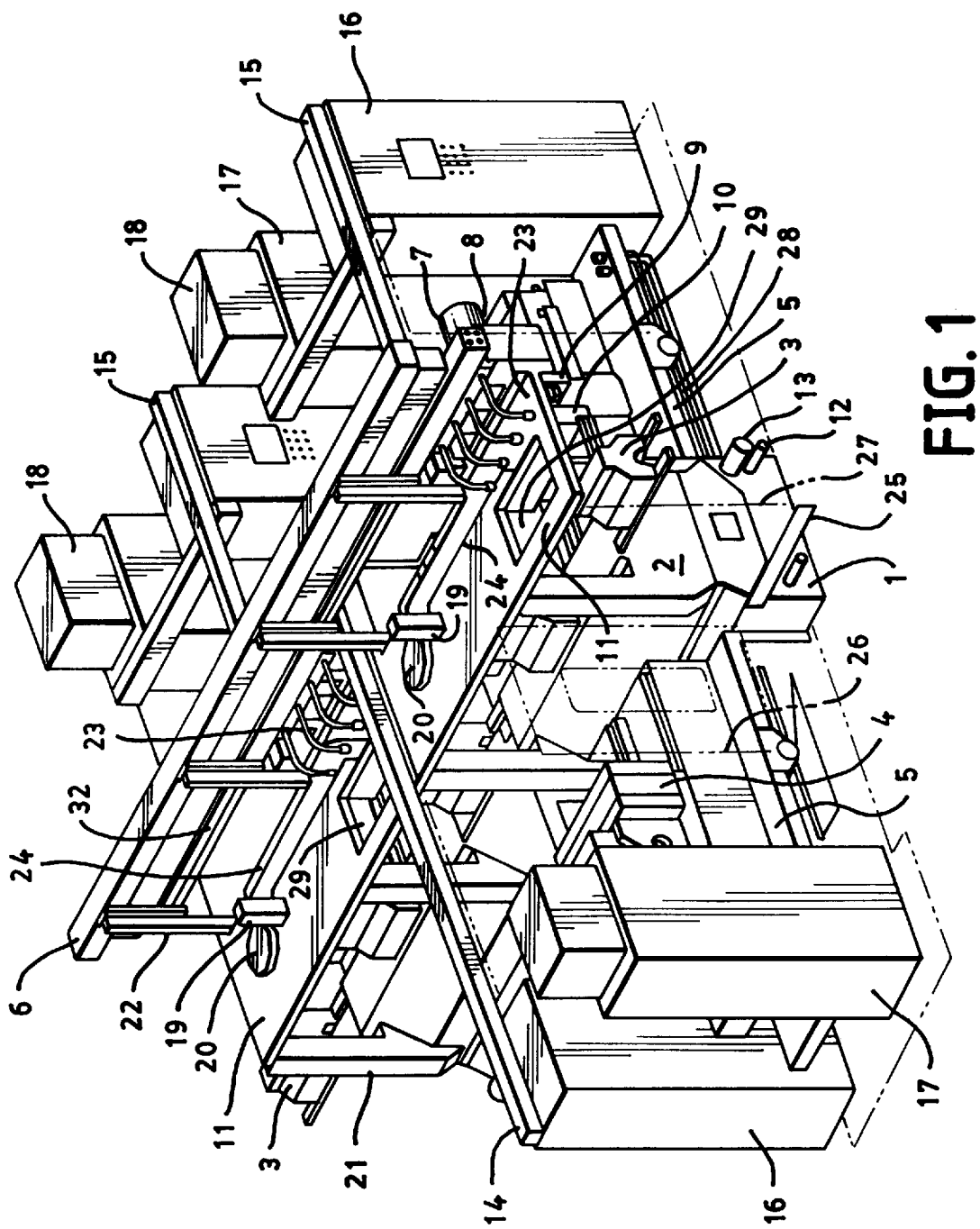
FIG. 1 is a perspective representations of the transfer line with some processing units.
Figure 2:
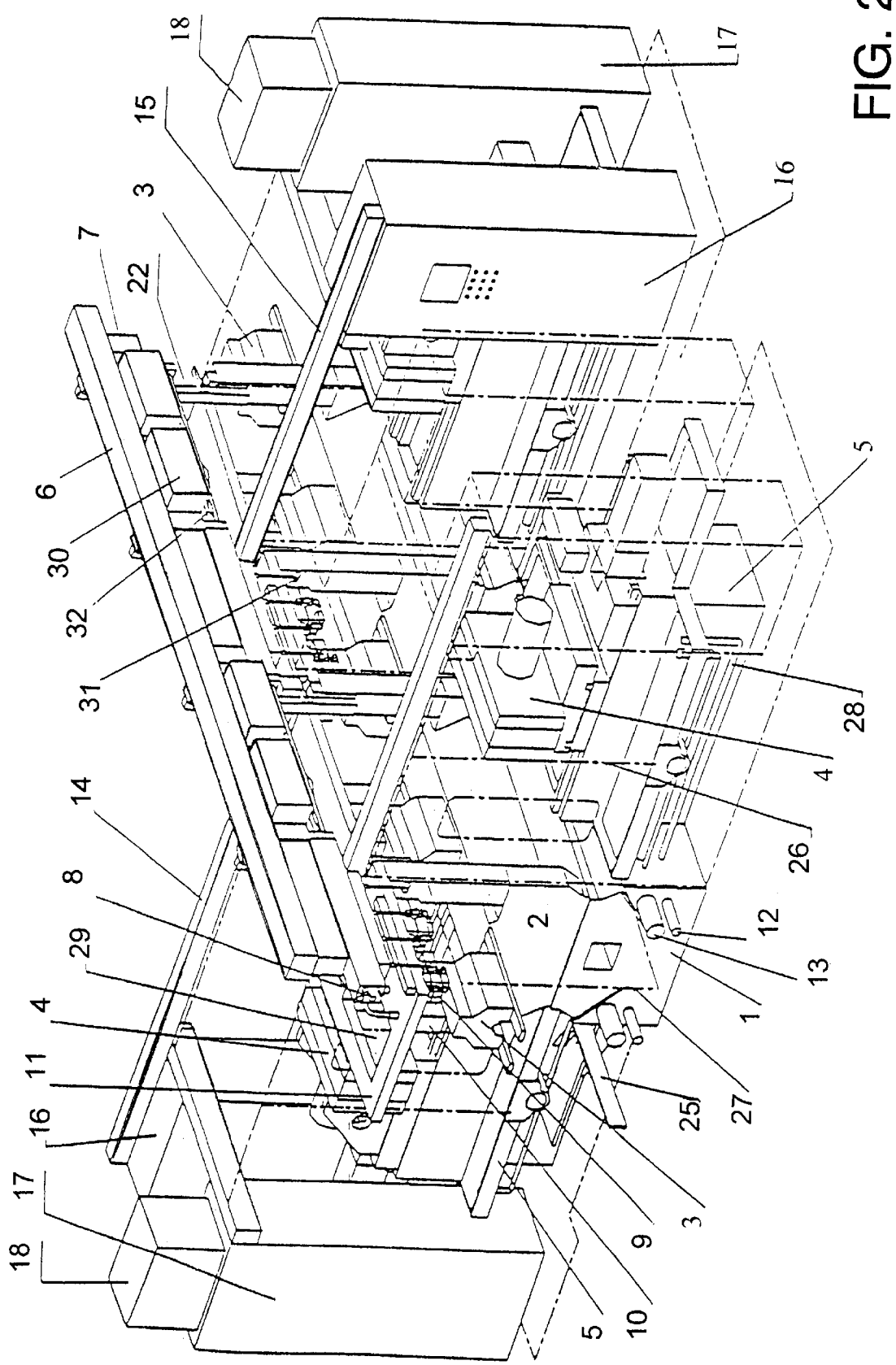
FIG. 2 is a perspective representations, of the transfer line with some processing units, taken at an angle different from FIG. 1.
Figure 3:
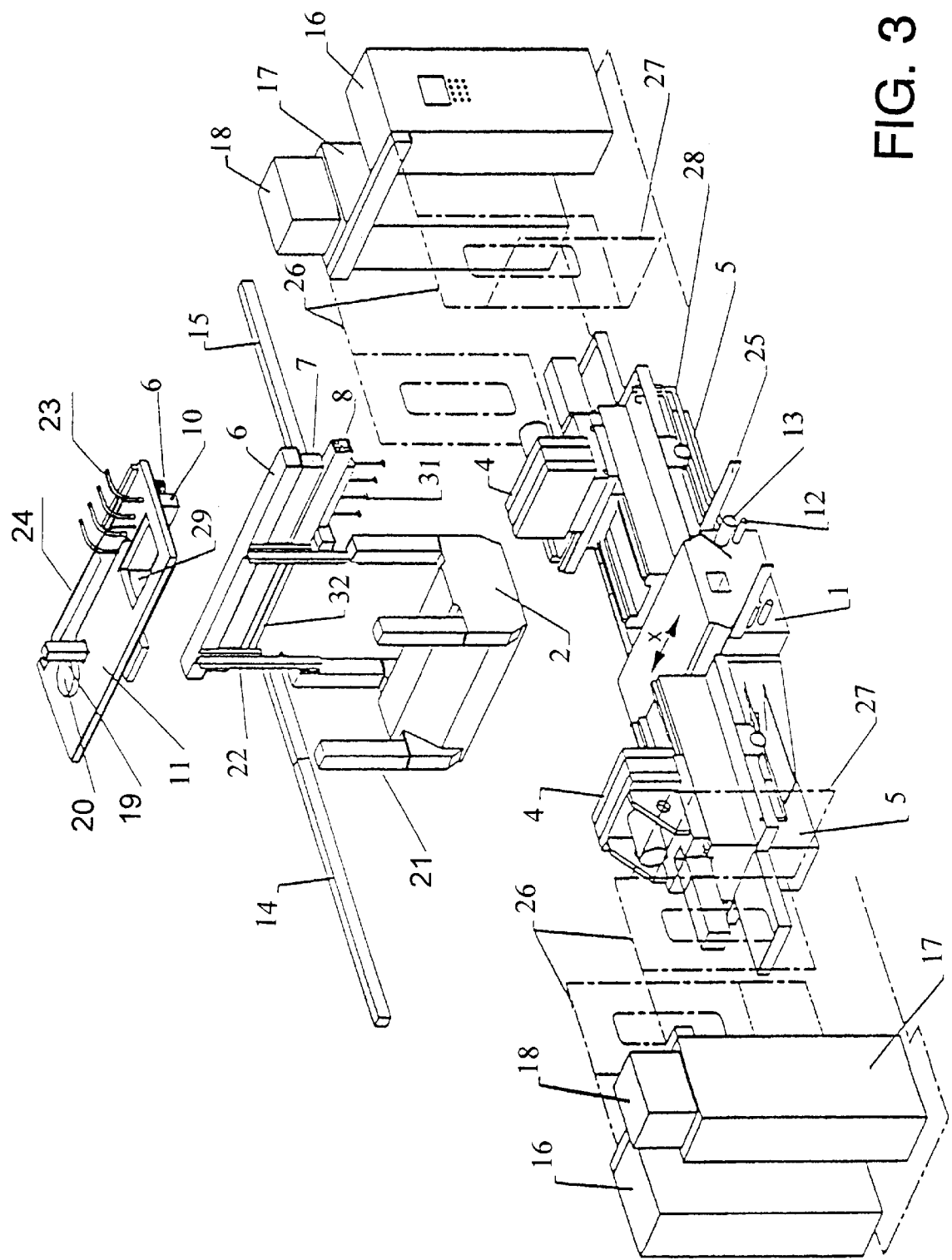
FIG. 3 is a front view showing a cycle unit with processing units located at both sides of the central base on lateral bases.
Figure 4:
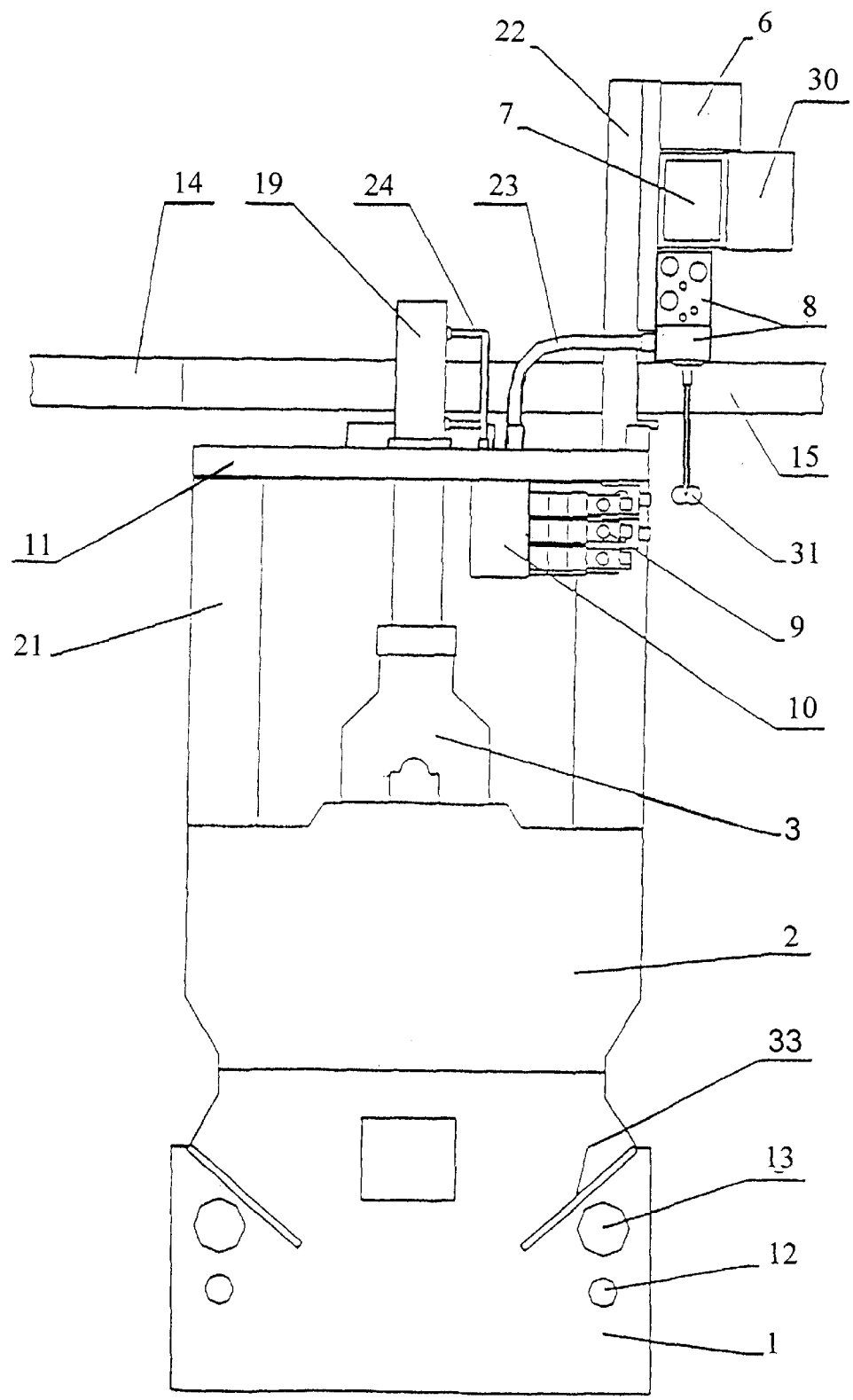
FIG. 4 is a vertical sectional view taken through the central part of the transfer line.

Referring to the drawings in particular, a central base is shown with the device base body 2 affixed upon it where work pieces 3 are moved. On the lateral bases 5 the processing units 4 allow for displacement at least transversely to the direction of work piece transportation. Laterally to the transport track of work pieces 3 vertical supports 21 are mounted on the device base body 2, with the plate 11 resting on these supports. At one longitudinal side the supports 21 are extended in length towards the top around supports 22 where the cable duct 6, conductor rails 7, fluid mains 32 for hydraulics, lubrication and pneumatics or similar and the distribution blocks 8 between the fluid mains 32 are affixed at the upper end at the outside in the transport direction of work piece 3. By way of the arrangement of the supply units outside at supports 22 the plate 11 with the clamping cylinders 19 affixed to it, the suction nozzles 20 and valve tubes 23 and 24 are accessible from the top and removable, if required, at any time without the necessity for a dismantling of the supply units. To allow for such an event, it is possible to close the shut-off cocks 31 at the fluid mains 32 of the neighboring stations so that the distribution block 8 can be taken out from the fluid main 32. The connections of valve tubes 23 at distribution block 8 or control block 10 can be loosened if the valves in distribution block 8 of the station concerned are closed in order to be able to dismantle plate 11 preferably towards the top. The plate 11 of control block 10 (control panel 11) represents the upper cover of the central tunnel which is moreover formed at bottom by the device base body 2 and laterally by the cladding 27 affixed to supports 21. Arranged at the underside of plate 11 is the control block 10 with the automatically actuated valves 9. Valve tubes 23 and 24 are conducted from the top through plate 11 and connected with control block 10. The connection mains within the central tunnel of control block 10 to the various consumers of the processing station are not shown here. In the area of the transition from one plate 11 to the next, there are branch channels 14 and 15 arranged transversely to the direction of work piece 3 transport. These branch channels 14, 15 serve as a connection of cable duct 6, conductor rails 7 and branch-off box 30 with switch cabinets 16 and 17. These branch channels 14 and 15, too, run in such a manner above or underneath or between the plates that they do not obstruct the dismantling of plates 11. The plate 11 forms a control panel. The plate 11 generally covers both one work station and one empty station. In the area of the empty station, plate 11 receives a lockable opening 29 through which the work piece as well as the measuring and testing device, if any, are easily accessible from the top. The coolant mains for high pressure 12 and low pressure 13 are accommodated in the central base 1 underneath the chip chute 33 and are connected via lines 28 affixed laterally at the lateral base 5 with the individual processing units 4. Processing units 4 set up on lateral bases 5 are housed by cladding 26, e.g. composed of sliding doors, while the area leading to the transport track of the work pieces remains open. Control cabinet 16 is connected to the power circuit cabinet through a branch channel not described more closely. Also shown on the power circuit cabinet 17 is the cooling aggregate 18. Two cycle units are connected with each other through usual connection strips 25.

While a specific embodiment of the invention has been shown and described in detail to illustrate the application of the principles of the invention, it will be understood that the invention may be embodied otherwise without departing from such principles.

What is claimed is:

1. A transfer line for machine tools for mechanical, metal removing processing of work pieces, the transfer line comprising:

a central base;

mechanical metal removing processing units with consuming elements;

conveying means for conveying work pieces along said central base, said conveying means including a workpiece transport track extending along said central base;

a lateral base set up along a side of said central base and another lateral base set up along another side of said central base, one of said processing units being mounted displaceably on said lateral base and another of said processing units being mounted displaceably on said another lateral base;

supply devices for supplying said processing units;

at least one of a distribution block and a fluid supply;

a plate disposed above said transport track;

valve tubes;

a control block mounted on said plate, adjacent to said transport track, said control block being connected through said valve tubes with said at least one of said distribution block and said fluid supply for establishing one or more of hydraulics, lubrication and pneumatics connections to said consuming elements of said processing units, said control block being arranged at an underside of said plate, said plate being wholly or partly shaped as a cover defining a part of a central tunnel surrounding said transport track; and a clamping cylinder for clamping one or more work pieces, said clamping cylinder being affixed to said plate and extending into said central tunnel.

2. The transfer line according to claim 1, wherein said distribution block includes lockable connections and can be installed into said fluid supply for each of said processing units as a construction unit.

3. The transfer line according to claims 1, further comprising a device base body and supports of said device base body, said plate resting on said supports of said device base body and being of a one-partite or multiple-partite configuration and being removable as an overall unit or in component parts, independently of the supply units.

4. The transfer line according to claim 3, further comprising: cable ducts and conductor rails, said cable ducts, said conductor rails and said fluid supply running in the direction of work piece transport being affixed laterally at said supports and/or above said device base body.

5. The transfer line according to claim 1, further comprising: branch channels running laterally or between plates, cable ducts, conductor rails and switch cabinets wherein said cable ducts and/or conductor rails are connected through said branch channels with at least one of said switch cabinets arranged outside in an area of ends of said lateral base and said another lateral base.

6. The transfer line according to claim 1, further comprising additional plates with connected control block forming further tunnel portions, said processing units defining stations along a length of the transfer line, wherein each plate in the direction of work piece transport covers at least two stations.

7. The transfer line according to claim 1, further comprising a suction nozzle and/or a pressure relief flap, for discharge of emission gases evolving on processing, arranged in or at said plate.

8. The transfer line according to claim 1, wherein a lockable opening, for take-out of work pieces from the central tunnel towards the top, is arranged in said plate.

9. The transfer line according to claim 1, further comprising high and/or low pressure mains for coolant integrated into said central base and/or mounted laterally at said central base.

10. The transfer line according to claim 9, wherein said high and/or low pressure mains for coolant are connected with said processing units through lines integrated in an associated one of said lateral base and said another lateral base and/or mounted unilaterally or bilaterally at said associated one of said lateral base and said another lateral base.

11. The transfer line according to claim 1, further comprising valves, for the feed of coolants to the processing units, mounted above water ducts at extreme ends of said lateral base and said another lateral base.

12. The transfer line according to claim 1, wherein:
a) said supply devices include supply lines running in a direction of work piece transport solely arranged inside or in an area and/or above said central base;
b) said supply lines are connected with each processing station via short, detachable connection pieces;
c) shut-off devices are at least arranged in fluid supply ; and
d) at least one said control block with valves is arranged between the shut-off devices and the processing station.

* * * * *